United States Patent [11] 3,600,597

[72] Inventor Nathan Swerdlow
 Philadelphia, Pa.
[21] Appl. No. 22,329
[22] Filed Mar. 24, 1970
[45] Patented Aug. 17, 1971
[73] Assignee General Electric Company
 Continuation-in-part of application Ser. No.
 794,049, Jan. 27, 1969, now Patent No.
 3,519,838.

[54] SPARE TRANSFORMER CONNECTING MEANS
 7 Claims, 4 Drawing Figs.
[52] U.S. Cl....................................................... 307/17
[51] Int. Cl....................................................... H02j 3/00
[50] Field of Search........................................... 307/17,
 112, 116, 119, 120, 121, 122

[56] References Cited
 UNITED STATES PATENTS
 3,462,611 8/1969 McMorris...................... 307/17

Primary Examiner—Robert K. Schaefer
Assistant Examiner—H. J. Hohauser
Attorneys—J. Wesley Haubner, William Freedman, Frank L. Neuhauser, Oscar B. Waddell and Joseph B. Forman ABSTRACT: Discloses a power system in which first, second and third single-phase transformers have their primary windings connected in delta. A spare transformer is disposed physically adjacent the third transformer and is provided with switching means for connecting its primary winding to the bus in a manner that enables the spare to serve as a replacement for the third transformer. Additional switching means is provided for connecting the primary winding of the third transformer to the bus in a way that enables the third transformer to serve as a replacement for the second transformer, should such replacement be necessary. Still additional switching means is provided for connecting the primary of the second transformer to the bus in a way that enables the second transformer to serve as a replacement for the first transformer, should this latter replacement be necessary.

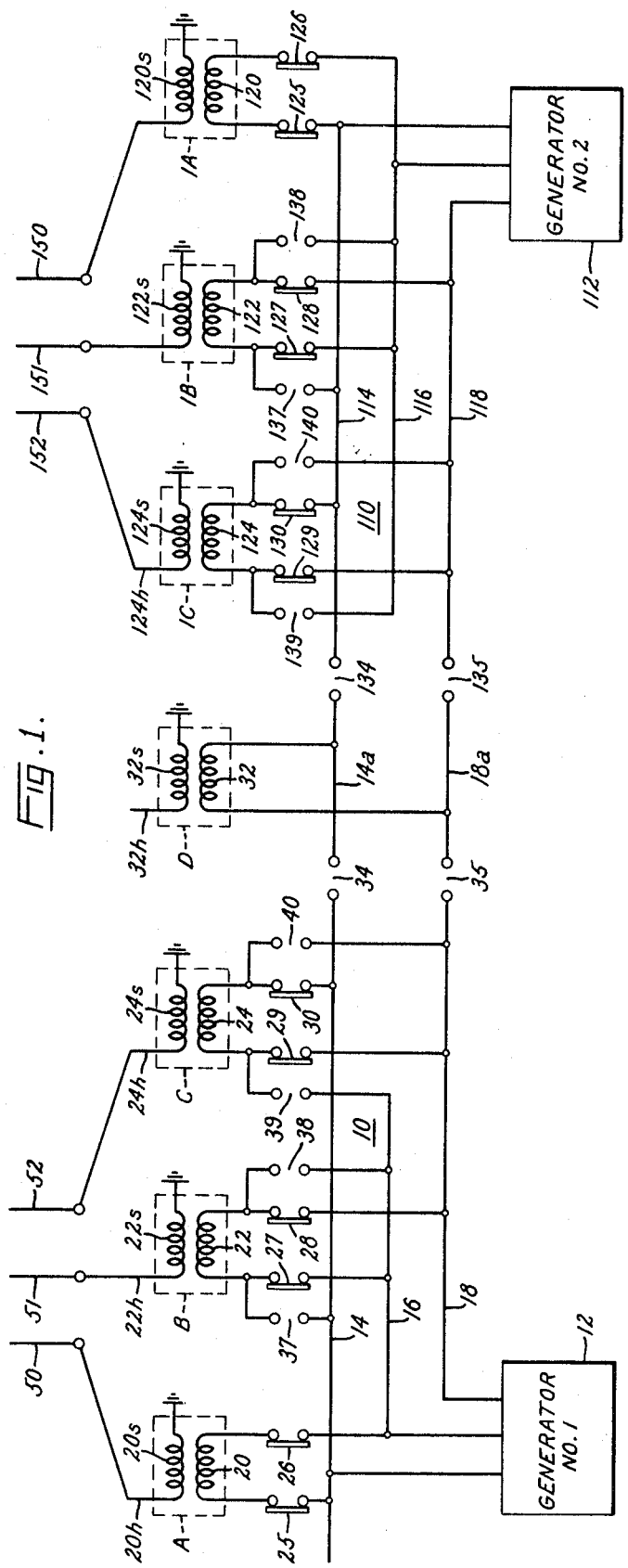

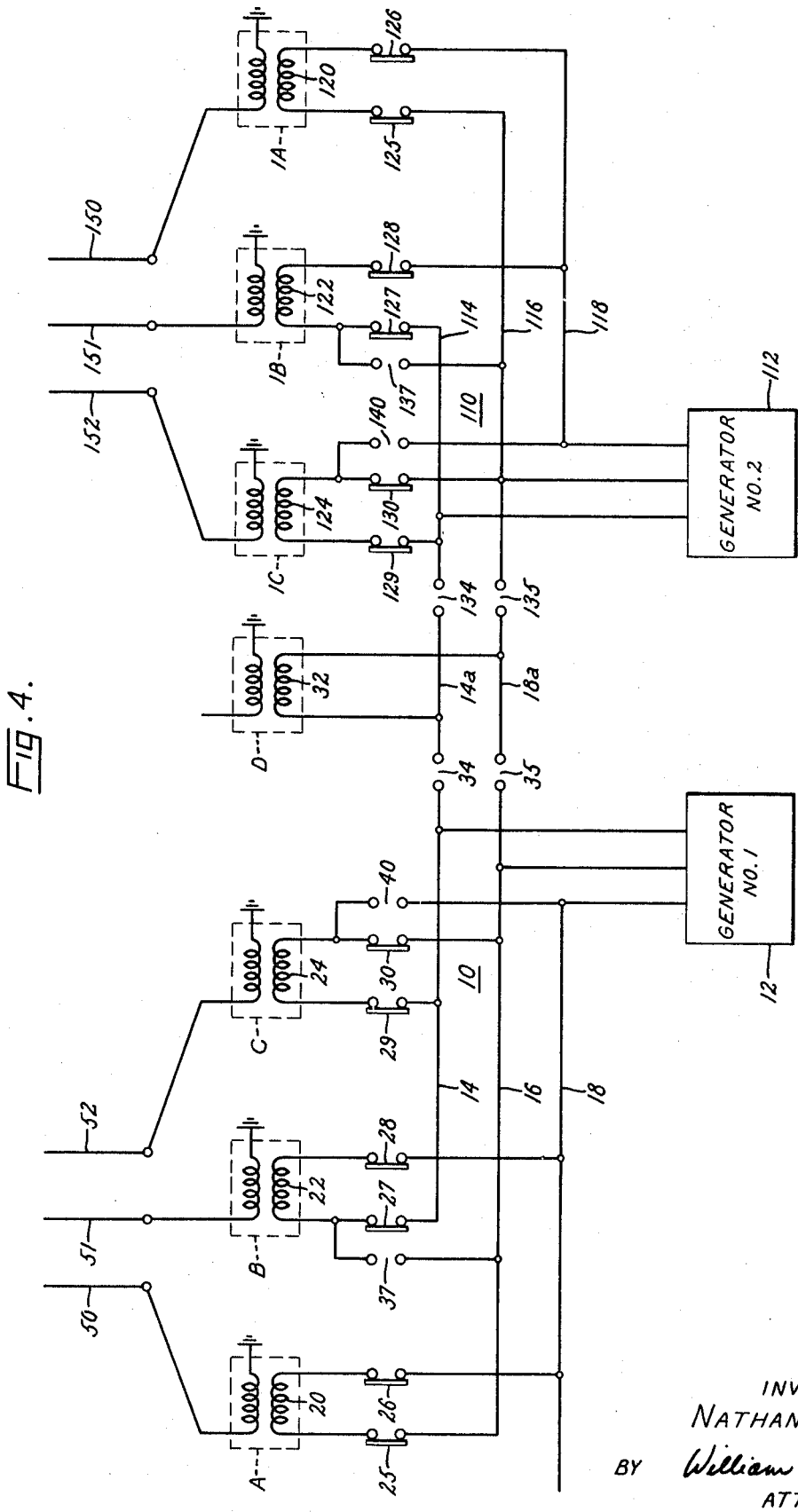

ent of any of the three single-phase transformers normally
3,600,597

SPARE TRANSFORMER CONNECTING MEANS

BACKGROUND

This application is a continuation-in-part of application Ser. No. 794,049, filed Jan. 27, 1969, and now U.S. Pat. No. 3,519,838.

This invention relates to means for connecting a spare transformer to a three-phase electric bus to provide for replacement of any of the three single-phase transformers normally connected in delta to the bus.

It sometimes becomes necessary to replace one of the single-phase transformers of such a system to permit repairs or other work to be performed on the transformer. The usual procedure for effecting this replacement is to disconnect and physically remove the deficient transformer and to physically move into the vacant location a spare transformer and then to connect the spare to the bus. Since these transformers can be quite massive, it will be apparent that this can be a time-consuming and expensive operation, particularly when it is realized that the power system must be shut down during this operation.

In my aforesaid application Ser. No. 749,049, I disclose and claim a switching arrangement that allows a spare transformer, without physical movement, to be used as a replacement for any one of the single-phase transformers that is removed from service. While that disclosed switching arrangement is quite satisfactory for its intended purpose, it is subject to the disadvantage that its use necessitates a secondary circuit of rather elaborate construction for interconnecting the secondary windings of the transformers. In this respect, if the spare transformer is connected to replace a transformer that is not immediately thereadjacent, then it is necessary to provide some form of crossover connection in the secondary circuit for electrically connecting the secondary winding of the spare transformer to the particular secondary phase conductor that had been connected to the replaced transformer. Such a crossover connection can consume a relatively large amount of space in view of the high voltage of the secondary circuit as compared to the primary. The crossover connection in the secondary circuit can be made by utilizing a secondary, or sparing, bus to which the various secondary windings can be suitably connected; but this too is relatively expensive and space consuming.

SUMMARY

An object of the present invention is to provide a switching arrangement that allows a spare transformer, without physical movement, to be used in replacing any one of the single-phase transformers of a delta-connected-primary transformer bank, yet without necessitating crossover connections or a sparing bus in the secondary circuit interconnection of the transformers.

Another object is to provide a switching arrangement that allows a spare transformer, without physical movement, to be used in replacing any one of the single-phase transformers of two separate delta-connected-primary transformer banks.

In carrying out my invention in one form, I provide a three-phase bus and first, second and third single-phase transformers having their primary windings connnected in delta to the bus through six normally closed disconnect devices, one of which is located between each primary winding terminal and the bus bar to which said primary terminal is normally connected. A spare transformer is located immediately adjacent a third one of said single-phase transformers, and between its respective primary terminals and the two buses across which said third transformer is normally connected are two normally open disconnect devices. These two normally open disconnect devices can be closed to connect the spare to the same bus bars as the third transformer was originally connected, thereby enabling the spare to serve as a replacement for the third transformer. First switching means comprising two normally open disconnect devices is operable when said latter disconnect devices are closed for connecting the terminals of said third transformer to the same bus bars as the terminals of said second transformer are normally connected. Second switching means comprising two additional normally open disconnect devices is operable when said latter disconnect devices are closed for connecting the terminals of said second transformer to the same bus bars as the terminals of said first transformer are normally connected. Said first switching means serves to connect said third transformer to the bus as a replacement for said second transformer, and said second switching means serves to connect said second transformer to the bus as a replacement for said first transformer.

For a better understanding of the invention, reference may be had to the following description taken in conjunction with the accompanying drawings, wherein:

BRIEF DESCRIPTION OF DRAWINGS

FIG. 1 is a schematic showing of an electric power system embodying one form of the invention.

FIG. 2 is a sectional view of a portion of the system depicted in FIG. 1. This view depicts a disconnect device in its closed position.

FIG. 3 is a sectional view similar to FIG. 2 except depicting the disconnect device in its open position.

FIG. 4 is a schematic showing of an electric power system embodying a modified form of the invention.

DETAILED DESCRIPTION OF THE PREFERRED EMBODIMENT OF

FIG. 1

Referring now to the schematic view of FIG. 1, there is shown a three-phase electric bus 10 that is supplied with alternating current by a three-phase generator 12. Bus 10 comprises three main bus bars 14, 16 and 18 which constitute the three phases of the bus. Connected in delta to the bus 10 are the primary windings 20, 22 and 24 of three single-phase transformers A, B, and C, indicated by dotted line blocks. Winding 20 is normally connected between bus bars 14 and 16; winding 22 between bus bars 16 and 18; and winding 24 between bus bars 14 and 18. Each terminal of each of the primary windings is connected to its associated bus bar through a normally closed disconnect device. These disconnect devices are respectively designated 25, 26, 27, 28, 29 and 30 in FIG. 1 and will be explained in greater detail hereinafter.

The secondary winding of each of the single phase transformers is shown adjacent its primary winding and is designated with the same reference character as the primary except with the suffix "s." The secondary windings are shown connected in a star connection, with one terminal of each secondary winding being connected to ground and the opposite terminals respectively connected to the three phase conductors 50, 51 and 52 of a high voltage three-phase transmission line.

It sometimes becomes necessary to replace one of the single-phase transformers to permit repairs or other work to be performed on it. To allow for such replacement, I have provided a spare single-phase transformer D having a primary winding 32 and a secondary winding 32s. This primary winding 32 is connected across two auxiliary bus bars 14a and 18a. These auxiliary bus bars 14a and 18a are adapted to be connected to main bus bars 14 and 18, respectively, but are normally disconnected therefrom by normally open disconnect devices 34 and 35.

To allow for connection of the primary winding 22 of transformer B across different bus bars from those across which it is normally connected, a pair of normally open disconnect devices 37 and 38 are provided therefor. Normally open disconnect device 37, when closed, is adapted to connect one terminal of winding 22 to bus bar 14, and normally open disconnect device 38, when closed, is adapted to connect the other terminal of winding 22 to bus bar 16.

The primary winding 24 of transformer C has similar normally open devices 39 and 40 for respectively connecting its terminals to bus bars 16 and 18 when closed.

REPLACING ONE OR MORE OF TRANSFORMERS A, B, AND C

When it is desired to remove the transformer A from service and to utilize spare transformer D, the various disconnect devices described hereinabove are operated to connect transformer B to the bus as a replacement for transformer A, to connect transformer C to the bus as a replacement for transformer B, and to connect the transformer D to the bus as a replacement for transformer C. This is done by performing the following steps. First, the normally closed disconnect devices 25 and 26 associated with A are opened to disconnect the primary wining of A from the bus. As a second step, the normally closed disconnect devices 27 and 28 associated with transformer B are opened, and the normally open disconnect devices 37 and 38 associated with B are closed. This connects primary winding 22 of B to the bus in the same manner as primary winding 20 of transformer A had been connected, i.e., across bus bars 14 and 16, thus preparing transformer B to serve as a replacement for transformer A. As a third step, normally closed disconnect devices 29 and 30 for transformer C are opened and normally open disconnect devices 39 and 40 for transformer C are closed. This connects primary winding 24 of transformer C to the bus in the same manner as the primary winding 22 of transformer B had originally been connected, i.e., across bus bars 16 and 18, thus preparing transformer C to serve as a replacement for B. As a fourth step, normally open disconnect devices 34 and 35 are closed to connect primary winding 32 of spare transformer D to the bus in the same manner as primary winding 24 of transformer C had originally been connected, thus preparing the spare transformer to serve as a replacement for C.

When it is desired to remove transformer B from service, its normally closed disconnect devices 27 and 28 are opened, and only the third and fourth steps of the preceding paragraph are performed. This leaves transformer A connected to the bus in its original manner but removes transformer B from service and replaces B with C and C with the spare transformer D.

When it is desired to remove transformer C from service, its normally open disconnect devices 29 and 30 are opened, and the normally open disconnect devices 34 and 35 are closed. This leaves A and B connected to the bus in the original manner but removes C from service and replaces C with spare transformer D.

The left-hand primary terminals of the transformers, which are illustrated as being remote from the grounded secondary terminals, are referred to herein as being corresponding terminals of the transformers. The opposite primary terminals, i.e., the right-hand terminals of the transformers, are also referred to with respect to each other as being corresponding terminals.

SECONDARY CIRCUIT CHANGES INVOLVED IN TRANSFORMER REPLACEMENT

Before service can be resumed after the above changes in the primary connections have been made, it is necessary to make suitable changes in the secondary winding connections. One such change is that when any transformer is removed from service, its high voltage secondary terminal is disconnected from the phase conductor 50, 51 or 52 to which it had been connected. Another such change is that the high voltage secondary terminal of any transformer that replaces another transformer is disconnected from any phase conductor to which it was originally connected and is connected instead to the phase conductor to which the high voltage secondary terminal of the replaced transformer had originally been connected. For example, if transformer A is being removed and replaced with transformer B, the high voltage secondary terminal 20$h$ of transformer A would be disconnected from phase conductor 50, and the secondary terminal 22$h$ of B would be disconnected from its original phase conductor 51 and connected instead to phase conductor 50 to which transformer A was originally connected. As another example, if B is being replaced by C, the high voltage secondary terminal 22$h$ of B would be disconnected from phase conductor 51, and the high voltage secondary terminal 24$h$ of C would be disconnected from its original phase conductor 52 and connected instead to phase conductor 51, to which transformer B was originally connected. As still another example, if transformer C is being replaced by spare transformer D the high voltage secondary terminal 24$h$ of transformer C would be disconnected from phase conductor 52, and the secondary terminal 32$y$ of spare transformer D would instead be connected to phase conductor 52.

It is to be noted that the above-described changes in the secondary winding connections are made without requiring that the connection of any high voltage secondary terminal to its phase conductor cross the connection of any other high voltage secondary terminal to its phase conductor. This follows from the fact that the transformers connected to the transmission circuit 50, 51, 52 after any of these changes in secondary connections are located in the same positional sequence as the positional sequence of the conductors 50, 51, 52 to which they are connected.

REPLACING ONE OR MORE OF TRANSFORMERS 1A, 1B, and 1C

In the illustrated power system I have shown an additional three-phase bus 110 which is supplied by a separate generator 112. Connected to this bus 110 in delta are the primary windings 120, 122 and 124 of three additional single-phase transformers 1A, 1B, and 1C. The components associated with additional bus 110 correspond to and are interconnected in the same manner as those associated with bus 10, and they therefore have been assigned corresponding reference numerals except with the prefix "1. " It is to be noted that of the transformers 1A, 1B and 1C, transformer 1C is closest to the spare transformer and transformer 1A is furthest from the spare transformer. In a like manner, of the transformers A, B, and C, transformer C is closest to the spare and A is furthest from the spare. It is to be understood that the two bus bars 10 and 110 are not intended to be electrically connected to each other.

One of the objects of this invention is to be able to use the spare transformer D in replacing any one of the transformers connected to either of the two buses 10 and 110. The above description explains how the spare can be used in replacing any of the transformers connected to the first bus 10. To permit use of the spare in replacing any one of the transformers connected to the other bus 110, I provide two normally open disconnect devices 134 and 135 connected respectively between bus sections 14$a$ and bus bar 14 and between bus section 18$a$ and bus bar 118. In essentially the same manner as described hereinabove with respect to transformers A, B, C and D, transformer 1B can be used as a replacement for transformer 1A; transformer 1C as a replacement for transformer 1B; and the spare transformer D as a replacement for transformer 1C. Such replacement is accompanied by changes in the secondary winding connections that correspond to the changes performed for transformers A, B, C and D when they are involved in a transformer replacement, as was explained hereinabove. In using spare transformer D as a replacement for transformer 1C, the high voltage secondary terminal 124$h$ of transformer C is disconnected from transmission line conductor 152 and the high voltage secondary terminal 32$h$ of spare transformer D is instead connected to conductor 152. After any transformer replacement operation involving transformers 1A, 1B, 1C and D, the transformers are in the same positional sequence as the positional sequence phase conductors 150, 151, 152 to which they are connected, thus avoiding the need for any crossover connections in the secondary connections.

STRUCTURE OF FIGS. 2 AND 3

The buses 10 and 110, including the leads to the transformer primary windings, and the auxiliary bus 10A are of the isolated phase type of construction. As such, each comprises a tubular metal housing, such as shown at 60 in FIG. 2, surrounding each of the bus bars or leads. Each metal housing is at ground potential and each is insulated from its enclosed conductor by suitable insulators (not shown) disposed between the conductor and housing. This general type of bus is conventional and is described in detail and claimed in U.S. Re. Pat. No. 26,333, Skeats, assigned to the assignee of the present invention.

Referring to FIG. 2, each of the disconnect devices, when in its closed condition, comprises a pair of spaced-apart terminal members 63 and a conductive disconnect link 64 bridging the space between the terminal members and bolted at its opposite ends to the terminal members by suitable bolts 66. Opening of the disconnect device is effected by removing bolts 66 and completely removing disconnect link 64. Referring to FIG. 3, each of the normally open disconnect devices is the same as the disconnect device shown in FIG. 2 except that the disconnect link 64 is absent. Closing of the normally open disconnect device is effected by inserting a disconnect link 64 taken from one of the normally closed disconnect devices between terminal member 63 and bolting it in place. In an open disconnect device, there is a removable grounded metal barrier 67 positioned between the two terminal members 63 in spaced relationship thereto. This barrier must, of course, be removed before disconnect link 64 can be connected between the two terminal members 63.

Access to each of the disconnect devices to permit such opening or closing can be had through an access opening 68 in tubular housing 60 disposed opposite the disconnect device. Access opening 68 is provided with a gasketed metal cover 69 detachably secured to housing 60 and sealing the access opening against the entry of foreign matter. Cover 69 is bolted in place and also is held in place by a key-operated lock shown in FIG. 2 at 70. The key for operating the lock is shown at 72.

When the disconnect device of FIG. 2 is to be opened, the bolts holding cover 69 in place are removed and key 72 is operated to unlock 70, thus allowing the cover to be removed. Disconnect link 64 is then unbolted and is removed, along with bolts 66, through access opening 68.

For cooling the illustrated buses, I provide sitable blowers (not shown) for forcing air or some other suitable coolant to flow through each of the tubular housings 60 from the generator to the connected transformer where it is suitably exhausted. The barriers 67 serve the added function of preventing any such coolant from being wasted by passage to a transformer that might be disconnected from the bus, in which case no coolant would be needed for its leads. For example, when the spare transformer D is disconnected from the buses, the barriers associated with its normally open disconnect devices 34, 35 and 134, 135 prevent any substantial volume of the coolant from passing into those housings 60 leading to the spare transformer D. Should, however, the spare transformer be connected to the bus, say as a replacement for transformer C, the coolant would be allowed to flow past then-closed disconnect devices 34 and 35, thus entering the housings 60 leading to the spare transformer D. No coolant would, however, be diverted to the then-disconnected leads to transformer C since the barriers 67 would then be present at 29 and 30 to block such flow.

It is to be noted that the isolated phase relationship of our bus bars is maintained irrespective of whether or not the spare transformer D is connected to the bus. In this respect, note that whether or not spare transformer D is connected to the bus, each phase conductor is surrounded by a grounded metal housing throughout its length extending from the generator to a connected transformer. Even at the open disconnect devices connected thereto, there is always a grounded metal barrier interposed between the phase conductor and any of the other phase conductors.

MODIFIED EMBODIMENT OF FIG. 4

The embodiment of FIG. 1 requires six normally open disconnect devices for each bus. In FIG. 4 I have shown an embodiment that requires only four normally open disconnect devices for each bus. In this embodiment, the three primary windings 20, 22 and 24 are normally connected in delta to the bus bars of bus 10 through six normally closed disconnect devices 25–30, one for each terminal of a primary winding. The primary winding of transformer A is connected between bus bars 16 and 18; the primary winding of transformer B between bus bars 14 and 18; and the primary winding of transformer C between bus bars 14 and 16. Spare transformer D has its primary winding 32 connected between two auxiliary bus bars 14a and 16a, which are respectively adapted to be connected to bus bars 14 and 16 through normally open disconnect devices 34 and 35.

To adapt transformer B to act as a replacement for transformer A, a normally open disconnect device 37 is connected between the left-hand terminal of primary winding 22 of B and bus bar 16. To adapt transformer C to act as a replacement for transformer B, a normally open disconnect device 40 is connected between the right-hand terminal of primary winding 24 of C and bus bar 18. To adapt the spare transformer D to act as a replacement for transformer C, the normally open disconnect devices 34 and 35 are relied upon.

Should it be desired to remove transformer A from service and to continue service with transformers B, C and D, transformer A would be replaced by transformer B, transformer B would be replaced by transformer C, and transformer C by the spare transformer D. Such replacements are effected, first of all, by opening disconnect devices 25 and 26 to remove A from service. Secondly, normally open disconnect device 37 is closed and normally closed disconnect device 27 is opened to connect the primary of B across bus bars 16 and 18. This replaces A with transformer B by connecting transformer B across the same bus bars 16 and 18 as A had originally been connected across. As a third step, normally open disconnect devices 40 are closed and normally closed disconnect device 30 is opened to connect primary winding 24 of transformer C across bus bars 14 and 18, which transformer B had originally been connected across, thus replacing B with C.

As a fourth step, normally open disconnect devices 34 and 35 are closed to connect the primary winding 32 of spare transformer D across bus bars 14 and 16, which transformer C had originally been connected across, thus replacing C with D.

The reason I am able to use only one normally open disconnect device for the primary winding of each of the transformers B and C is that each of these primary windings has one terminal connected to the same bus as one of the terminals of the primary winding it replaces was originally connected to. For example, the right-hand primary terminal of transformer B is connected to bus bar 18, which is the same bus bar as the right-hand terminal of transformer A is connected to. Thus, when B replaces A, it is unnecessary to change the connection of its right-hand terminal, this terminal remaining connected to bus bar 18. Similarly, when transformer C replaces transformer B it is unnecessary to change the connection of its left-hand primary terminal inasmuch as this terminal is connected to bus bar 14, the same bus bar to which left-hand primary terminal of transformer B was originally connected.

In the embodiment of FIG. 4, there is an additional three-phase bus 110 supplied by a separate generator 112. Connected to this bus in delta are the primary windings 120, 122 and 124 of three additional single-phase transformers 1A, 1B, and 1C. The components associated with additional bus 110 correspond to and are interconnected in the same manner as those associated with the bus 10, and they are assigned corresponding reference numerals except with the prefix "1." With respect to each bus, the transformer with the designation C is closest to the spare transformer D and that with the designation A is furthest from the spare.

In the embodiment of FIG. 4, the spare transformer can be used in replacing any one of the transformers connected to the additional bus 110 in essentially the same manner as it is used in replacing the transformers A, B and C connected to bus 10, as was described hereinabove. In this respect, transformer 1B can be used as a replacement for transformer 1A; transformer 1C can be used as a replacement for transformer 1B; and spare transformer D as a replacement for transformer 1C. For effecting a given replacement, the disconnect devices corresponding in reference character to those used with bus 10 for effecting a corresponding replacement are operated in the same manner as described with respect to bus 10.

The above-described changes in the connection of the primary windings must be accompanied by suitable changes in the connections of the secondary windings. Such changes in the secondary connections have been described hereinabove with respect to FIG. 1 and basically involve disconnecting the high voltage secondary terminal of any replaced transformer from its original phase conductor and connecting to this phase conductor the high voltage secondary terminal of the particular transformer that replaces the disconnected transformer.

While I have shown and described particular embodiments of my invention, it will be obvious to those skilled in the art that various changes and modifications may be made without departing from the invention in its broader aspects; and I, therefore, intend herein to cover all such changes and modifications as fall within the true spirit and scope of my invention.

What I claim as new and desire to secure by Letters Patent of the United States is:

1. In an electric power system that comprises: (1) a three-phase isolated phase bus comprising three bus bars, (2) first, second, and third single-phase transformers, each having a primary winding with a pair of terminals, (3) a pair of normally closed disconnect devices for each of said primary windings connecting said three primary windings in delta to said bus, the normally closed disconnect devices of each pair being located between the terminals of the associated primary winding and the bus bars to which said terminals are respectively connected, (4) a spare transformer located adjacent said third transformer and having a primary winding with a pair of terminals; means for utilizing said spare transformer when any one of said three single-phase transformers is disconnected from said bus, comprising:
   a. two normally open disconnect devices respectively connected between the terminals of said spare transformer and the two bus bars that said third transformer is normally connected to and closable to connect said spare transformer to said two bus bars as a replacement for said third transformer,
   b. first means comprising a normally open disconnect device and effective when said latter normally open disconnect device is closed for connecting the terminals of said third transformer to the same bus bars as the terminals of said second transformer are normally connected,
   c. second means comprising a normally open disconnect device and effective when said latter disconnect device is closed for connecting the terminals of said second transformer to the same bus bars as the terminals of said first transformer are normally connected,
   d. said first means being operable to connect said third transformer to said bus as a replacement for said second transformer and said second means being operable to connect said second transformer to said bus as a replacement for said first transformer.

2. The electric power system of claim 1 in which:
   a. said third transformer has one of its terminals normally connected to the same bus bar as the corresponding terminal of said second transformer is normally connected, and
   b. said second transformer has one of its terminals normally connected to the same bus bar as the corresponding terminal of said first transformer is normally connected.

3. The electric power system of claim 1 in which:
   a. said first means comprises two normally open disconnect devices that are operable when closed to connect the terminals of said third transformer to the same two bus bars as the terminals of said second transformer are normally connected, and
   b. said second means comprises two normally open disconnect devices that are operable when closed to connect the terminals of said second transformer to the same two bus bars as the terminals of said first transformer are normally connected.

4. The electric power system of claim 1 in combination with a plurality of housings at ground potential respectively surrounding each of said bus bars,
   b. bus-cooling means for causing a flow of cooling fluid to flow through said housings along the surrounded bus bar toward any transformer connected to said bus bar,
   c. the metal housing surrounding a given bus bar also having a portion surrounding the disconnect device connected thereto,
   d. a removable barrier associated with each disconnect device when it is in open position for blocking the flow of gas past said open disconnect device toward the transformer to which said open disconnect device is connected, and
   e. means requiring removal of the barrier associated with a given open disconnect device as a prerequisite to closing of said open disconnect device, thus permitting cooling gas to flow past a closed disconnect device without interference from the barrier.

5. In an electric power system as set forth in claim 1 and further comprising: (1) an additional three-phase bus comprising three additional bus bars, (2) additional first, second and third single-phase transformers, each having a primary winding with a pair of terminals, said additional third transformer being located closer to said spare transformer than the additional second and first transformers, (3) a pair of normally closed disconnect devices for each of said additional primary windings connecting said three additional primary windings in delta to said additional bus, the normally closed disconnect devices of each pair being located between the terminals of the associated primary winding and the additional bus bars to which said terminals are respectively connected; means for utilizing said spare transformer when any one of said additional single-phase transformers is disconnected from said additional bus, comprising:
   a. two additional normally open disconnect devices respectively connected between the terminals of said spare transformer and the two additional bus bars that said additional third transformer is normally connected to and closable to connect said spare to said two additional bus bars as a replacement for said additional third transformer,
   b. third means comprising a normally open disconnect device and effective when said latter disconnect device is closed for connecting the terminals of said additional third transformer to the same additional bus bars as the terminals of said additional second transformer are normally connected,
   c. fourth means comprising a normally open disconnect device and effective when said latter disconnect device is closed for connecting the terminals of said additional second transformer to the same additional bus bars as the terminals of said additional first transformer are normally connected,
   d. said third means being operable to connect said additional third transformer to said additional bus as a replacement for said additional second transformer and said fourth means being operable to connect said additional second transformer to said bus as a replacement for said additional first transformer.

6. The electric power system of claim 5 in which:
a. said additional third transformer has one of its terminals normally connected to the same additional bus bar as the corresponding terminal of said additional second transformer is normally connected, and
b. said additional second transformer has one of its terminals normally connected to the same additional bus bar as the corresponding terminal of said additional first transformer is normally connected.

7. The electric power system of claim 5 in which:
a. said third means comprises two normally open disconnect devices that are operable when closed to connect the terminals of said additional third transformer to the same two additional bus bars as the terminals of said additional second transformer are normally connected,
b. said fourth means comprises two normally open disconnect devices that are operable when closed to connect the terminals of said additional second transformer to the same two additional bus bars as the terminals of said additional first transformer are normally connected.